United States Patent [19]

Orsborn

[11] Patent Number: 4,742,672
[45] Date of Patent: May 10, 1988

[54] COTTON PICKER DOFFER ADJUSTMENT ASSEMBLY

[75] Inventor: Jesse H. Orsborn, Hinsdale, Ill.

[73] Assignee: J. I. Case Company, Racine, Wis.

[21] Appl. No.: 15,781

[22] Filed: Feb. 17, 1987

[51] Int. Cl.⁴ .......................................... A01D 46/16
[52] U.S. Cl. ....................................... 56/41; 56/11.9; 56/40
[58] Field of Search ............... 56/40, 41, 28, 30, 11.9, 56/249, DIG. 11

[56] References Cited

U.S. PATENT DOCUMENTS

| | | |
|---|---|---|
| 2,654,202 | 10/1953 | Millard . |
| 2,664,688 | 1/1954 | Nickla .................................... 56/41 |
| 2,664,689 | 1/1954 | Walker et al. . |
| 3,014,332 | 12/1961 | Hubbard . |
| 3,224,178 | 12/1965 | Kennedy . |
| 3,292,352 | 12/1966 | Shaw . |
| 3,427,791 | 2/1969 | Hubbard ................................ 56/41 |

Primary Examiner—John Weiss
Attorney, Agent, or Firm—Dressler, Goldsmith, Shore, Sutker & Milnamow, Ltd.

[57] ABSTRACT

A cotton picker doffer element adjustment mechanism which continuously and automatically adjusts the elevation of the doffer elements in relationship with the picker spindles as the doffer pads wear. The doffer elements continuously gravitate downwardly to maintain contact between the doffer pads and the picker spindles. A hydraulic fluid arrangement is provided to automatically prevent upward movement of the doffer elements. A manually operable device may be provided to selectively exert additional pressure over gravity to the doffer elements or to permit gravity to be overridden. An external pressure source may be provided to supplement the downward gravitation of the doffer elements.

16 Claims, 3 Drawing Sheets

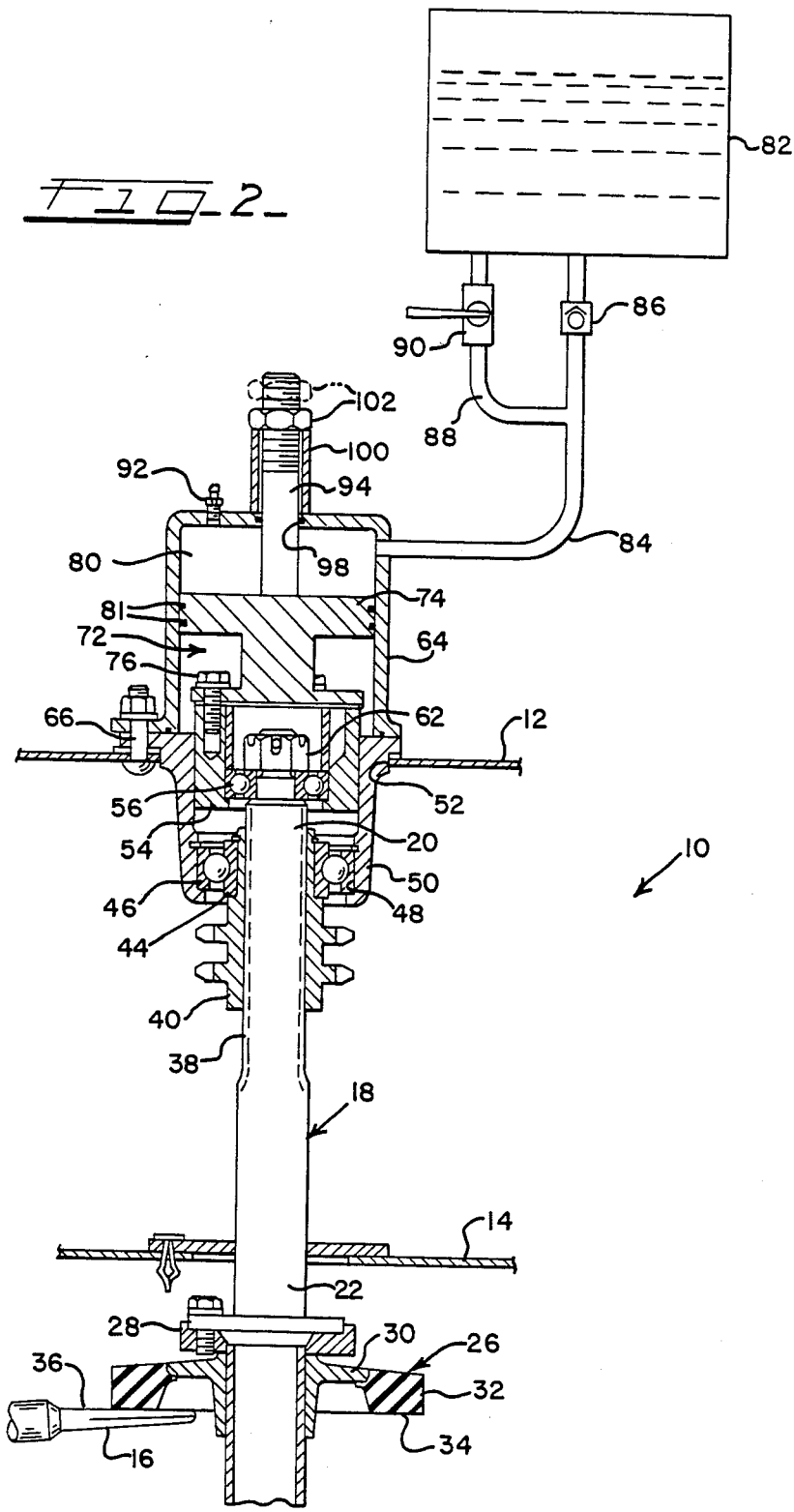

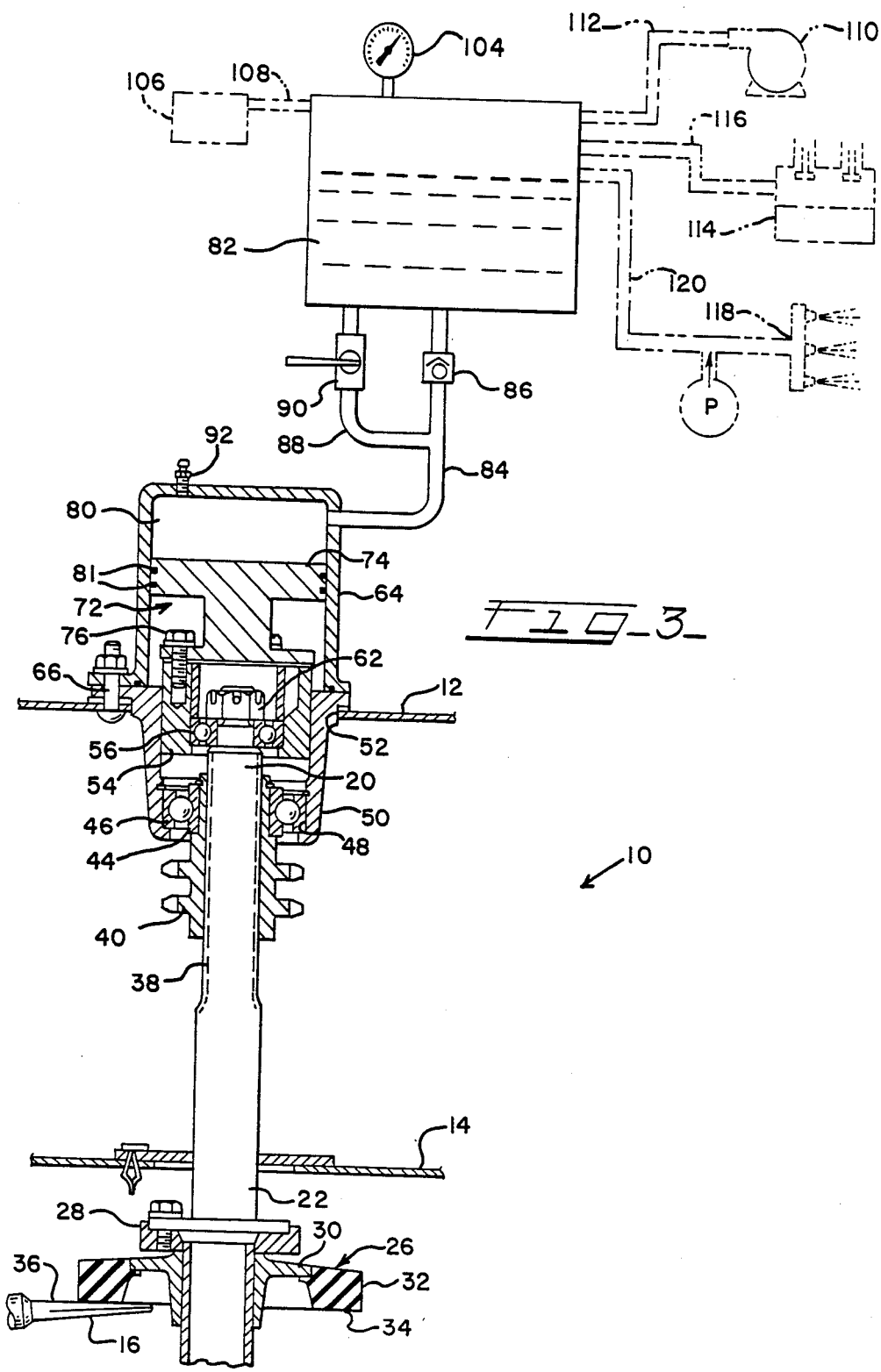

COTTON PICKER DOFFER ADJUSTMENT ASSEMBLY

FIELD OF THE INVENTION

The invention relates generally to cotton pickers, and more specifically to an adjustment mechanism for continuously adjusting the spatial relationship between the picker spindles and the associated doffer elements.

BACKGROUND OF THE INVENTION

As is well known in the art, cotton pickers embody a plurality of rotating picker spindles arranged for systematic insertion into a cotton plant such that the picker spindles entwine or snag cotton from the plant. The picker spindles, with the cotton wound thereon, are then directed out of the path of the cotton plants and into operative association with a rotating doffer assembly to remove or strip the cotton from the spindles.

The doffer assembly typically comprises a series or stack of vertically spaced doffer elements carried on a driven vertical shaft. The doffer elements each typically include a disk with several doffer lugs or pads mounted thereunder, with the pads positioned so that they sweep over a horizontal row of rotating picker spindles which are projected into the doffer path. The doffer pads are typically formed of rubber, or a like elastomeric material, and in use they gradually wear away. Accordingly, periodic adjustment is required to maintain the correct spatial relationship between the doffer pads and the picker spindles having cotton wound thereon.

The proper spatial relationship between the doffer pads and the picker spindles is critical for proper performance of the picking operation. In most field conditions the doffer pads must just touch the picker spindle surface for proper removal of harvested lint from the spindles. However, some field conditions may require an interference between the doffer pads and the picker spindles surface to maximize performance of the picking operation.

It has heretofore been the practice to utilize a screw type adjustment arrangement to manually move the stack of doffer elements up or down in relationship to the picker spindles and to lock the doffer elements in a fixed vertical position. If the doffer elements are locked in position with the doffer pads either just touching or in interference with the picker spindles, this relationship will change in a short period of time as the doffer pads wear away on the surface of the spindles, and the contact or interference setting is lost. If the doffer elements are not readjusted, the picker spindles will tend to wrap with cotton lint. It has been found that under certain field conditions it is necessary to readjust the doffer elements one or more times a day to maintain the cleanliness of the picker spindles. An example of such a cotton picker doffer arrangement is disclosed in U.S. Pat. No. 2,664,689, assigned to the same assignee as the present invention.

It is therefore desirable to provide a cotton picker doffer arrangement which continuously and automatically adjusts the spatial relationship between the doffer elements and the picker spindles. This would eleminate a burden on the machine operator of observing the picker spindles and periodically adjusting the doffer elements to maintain clean spindles for correct harvesting efficiency. Neglect in doffer element adjustment is probably the main cause of premature doffer failure and machine downtime.

SUMMARY OF THE INVENTION

Briefly stated, the present invention provides a cotton picker doffer element adjustment mechanism which continuously and automatically adjusts the elevation of the doffer elements in relationship with the picker spindles. In accordance with a first preferred embodiment of the invention, the doffer elements gravitate downwardly to maintain contact between the doffer pads and the picker spindles. In accordance with a second preferred embodiment of the invention, a manual adjustment device is provided to selectively exert additional pressure over gravity to the doffer elements, or to permit gravity to be overridden. In accordance with a third embodiment of the invention, an external pressure source is provided to supplement the downward gravitation of the doffer elements.

More specifically, in the first embodiment of the invention, a cotton picker doffer assembly is disclosed including a row of picker spindles, and a doffer element having doffer pads positioned adjacent the spindles for removing cotton therefrom. The doffer element is attached to a drive shaft, which in turn is splined to a rotating sprocket sleeve, so as to permit the drive shaft to gravitate downwardly and thereby maintain continuous contact between the doffer pads and the picker spindles as the doffer pads wear.

Upward movement of the drive shaft is prevented to maintain the continuous contact between the doffer pads and the picker spindles. Such upward movement is prevented by a hydraulic arrangement including a piston member attached to an upper end portion of the drive shaft, with the piston received for vertical movement within a hydraulic cylinder cavity. The volume of the hydraulic cylinder above the piston member is maintained full of incompressible hydraulic fluid so as to prevent upward movement of the piston member in the cavity.

The volume of the cavity above the piston member is in fluid communication with a reservoir containing the fluid via a fluid line having a check valve to prevent the backflow of fluid therethrough. As the doffer pads wear, the piston member, drive shaft and the doffer element automatically gravitate downward, and the volume of the cylinder cavity above the piston member fills with the hydraulic fluid so as to prevent upward movement of these elements. A bypass line, having a manually operable bypass valve therein, is provided to bypass the check valve and to selectively permit backflow of fluid into the reservoir. In this way, the operator can move the doffer assembly upward as may be required.

In the second preferred embodiment of the invention, a manually operable threaded adjustment device is additionally provided to selectively permit additional downward pressure to be applied to the piston member connected to the doffer assembly, or to permit the gravitational pressure applied to the piston member to be overridden. The device includes an adjustment rod secured to the piston member, which extends upwardly through the hydraulic cylinder cavity above the piston member. The adjustment rod is received through a sleeve aligned with an opening in the upper surface of the cavity and extends upwardly therefrom. The upper end of the adjustment rod is threaded and receives an adjustment nut.

If a clearance is desired between the doffer element pads and the picker spindles, the bypass valve to the fluid reservoir is opened, and the adjustment nut on the adjustment rod is tightened until the desired clearance is obtained. The bypass valve is then closed and the doffer element spacing is maintained. If it is desired that the doffer element pads just touch the spindles, the adjustment nut is loosened on the adjustment rod, and gravity will automatically maintain the doffer element pads in contact with the picker spindles. If it is desired to increase the pressure applied by the doffer element pads to the picker spindles, to provide an interference therebetween, the adjustment nut is loosened and pressure is applied to the adjusting rod to achieve the desired interference adjustment.

In the third preferred embodiment of the invention, an external pressure source is provided in communication with the hydraulic fluid reservoir to apply pressure to the hydraulic fluid acting on the piston, and thereby apply an additional force to the doffer element pads at the picker spindles. The pressure source may be an accumulator adjustable for different field conditions, the picker conveyor fan plenum, the water system of the cotton picker, or other suitable external sources.

Numerous other advantages and features of the present invention will become apparent from the following detailed description of the invention, from the claims, and from the accompanying drawings.

BRIEF DESCRIPTION OF THE DRAWINGS

In the accompanying drawings forming a part of the specification, in which like numerals are employed to designate like parts throughout the same.

FIG. 2 is a view similar to FIG. 1 depicting a doffer element adjustment mechanism in accordance with a second preferred embodiment of the invention; and FIG. 3 is a view similar to FIG. 1 depicting a doffer element adjustment mechanism in accordance with a third preferred embodiment of the invention.

DESCRIPTION OF THE PREFERRED EMBODIMENTS

Figure 1:
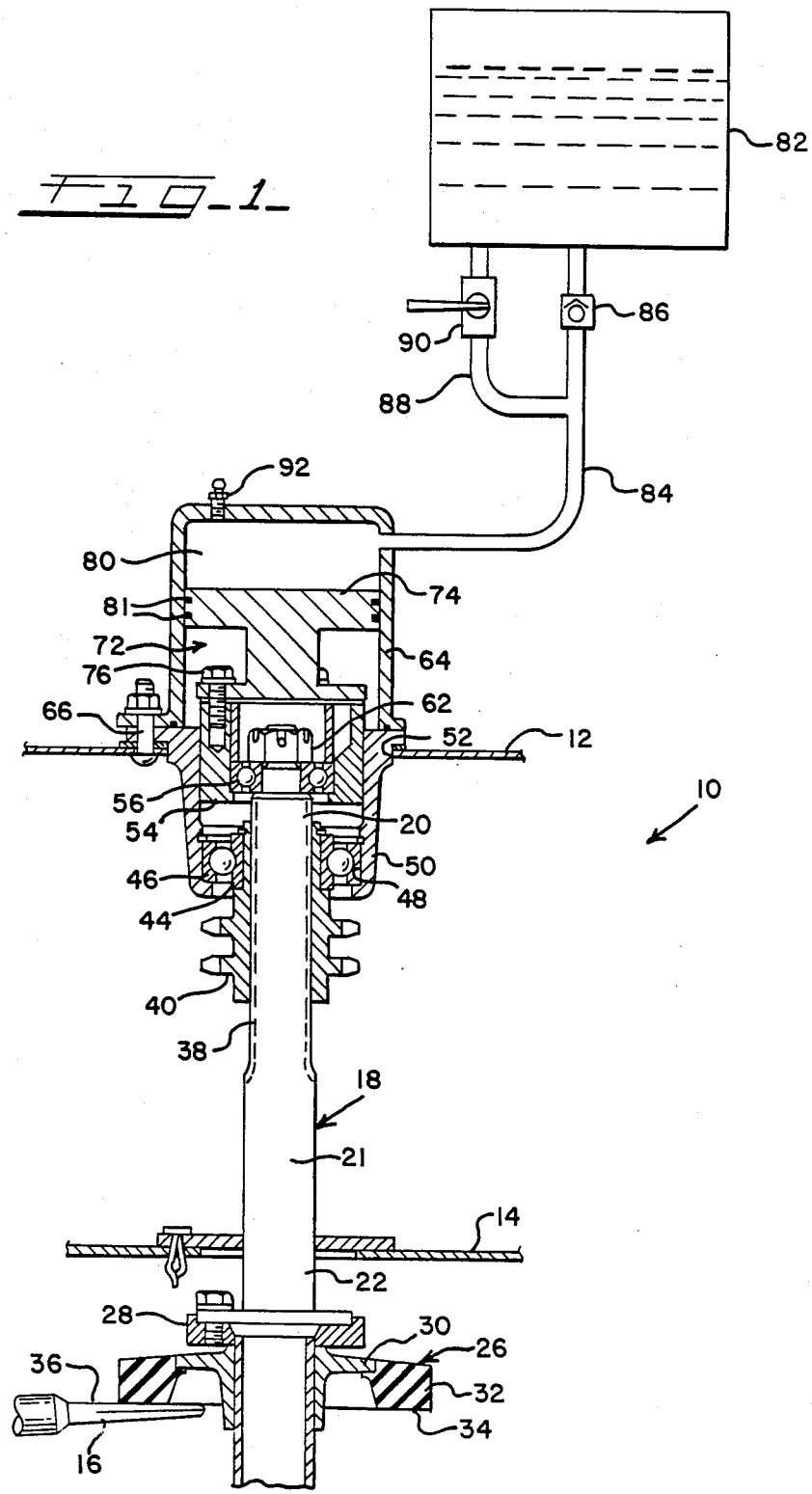
FIG. 1 is a fragmentary vertical sectional view of a cotton picker drum structure showing a portion of a cotton picker doffer assembly, with parts omitted for clarity, incorporating a doffer element adjustment mechanism in accordance with a first preferred embodiment of the invention.

The present invention is susceptible of embodiments in many different forms. The specification and the accompanying drawings disclose three specific exemplary embodiments of the invention. However, the invention is not intended to be limited to the embodiments described, and the scope of the invention will be pointed out in the appended claims.

The figures illustrating the embodiments of the invention diagrammatically and schematically show structural details of conventional mechanical elements that will be recognized by one skilled in the art. However, detailed drawings and descriptions of such elements are not necessary to an understanding of the invention, and accordingly, are not herein presented.

Referring to FIG. 1, an upper portion of a picker drum section of a typical cotton picker is indicated by the reference numeral 10. Drum section 10 includes a top plate 12 and a center plate 14. Inasmuch as the invention resides in an improved doffer element adjustment mechanism, only such limited parts of the picker construction have been shown as are necessary to illustrate the invention.

A plurality of vertically spaced picker elements or spindles 16 (only the upper one being shown) are mounted within the drum section 10 for rotation about a vertical axis in a well known manner. A substantially vertical doffer drive shaft 18, having an upper end portion 20, an intermediate portion 21, and a lower end portion 22, extends through plate 14. A doffer stack assembly, having a plurality of vertically spaced doffer elements 26 (only the upper one being shown), is secured to lower end portion 22 of the drive shaft for rotation therewith through a junction connection 28.

Doffer elements 26 are of well known construction, and typically comprise a circular plate portion 30 having doffer lugs or pads 32 attached thereto defining generally flat surfaces 34 in facing relationship to the corresponding picker spindles 16. Although only an upper one of the picker spindle elements 16, and the upper one of doffer elements 24 are shown, it is understood that a plurality of picker spindles are stacked one above the other with each picker spindle having a corresponding doffer element associated therewith. The picker spindles 16 are typically formed with tapered outer barbed and fluted ends and angularly extend from their rotation mounting shaft (not shown) so as to present substantially horizontal upper surfaces 36 in facing relationship to the corresponding surfaces 34 of the doffer pads.

The intermediate portion 21 of drive shaft 18 has a splined connection at 38 with a driving member in the form of a sprocket 40 positioned thereon so as to permit vertical movement of shaft 18 relative to sprocket 40. The sprocket 40 has an upwardly extending portion in the form of a sleeve or collar which fits snugly through an inner race 44 of a bearing assembly 46. The bearing assembly 46 is fitted within a bore 48 in a lower bearing housing or cup 50 nested within an opening 52 in the top plate 12. The bearing assembly 46 serves as a supporting rotatable connection or mounting between the shaft 18 and the sprocket 40, and the support structure including the lower bearing housing 50.

An upper bearing housing 54 extends into the lower bearing housing 50, with its outside surface formed to provide a slip fit with the inside surface of the lower bearing housing 50 so as to permit vertical movement of housing 54 relative to housing 50. An upper bearing assembly 56 fits into a complementary bore in housing 54. The upper end portion 20 of shaft 18 is of reduced diameter and is snugly fitted through the inner race of the bearing assembly 56. End portion 20 is threaded and receives a locking nut 62 to attach it to inner race of bearing assembly 56.

An inverted cup-shaped cover member 64 is attached to lower bearing housing 50 by bolts 66 (one shown) which extend through connecting flanges respectively associated with cover member 64 and housing 50. Bolts 66 extend through top plate 12 to secure the cover member and the lower bearing housing thereto. Cover member 64 defines a hydraulic cylinder cavity 72 above lower housing 50 into which the upper end of upper housing 54 extends. An optional seal surface can be provided at the interface of cover member 64 and housing 50 to keep the area between the upper and lower housings 54 and 50, and thus maintain the integrity of the slip fit therebetween.

A piston member 74 is received within cavity 72 and is attached at a lower end portion thereof to an upper end portion of the upper bearing housing 54 by bolts 76 (one shown) extending through a connecting flange of the piston member. The upper end portion of piston member 74 is dimensioned such that the outer surface thereof engages the inner surface of cover member 64 in sliding, sealing relationship. To this end, suitable seals 81 can be provided. The portion of cylinder cavity 72 above piston member 74 defines a sealed volume or chamber 80 for receiving hydraulic fluid as will now be described.

It will be appreciated that the vertical movement of piston member 74 within cavity 72 is translated through bearing housing 54 to vertical movement of shaft 18 and the doffer stack assembly attached thereto. Accordingly, by controlling the relative vertical position of piston member 74 within cavity 72, the spatial relationship between the doffer lugs 32 and the corresponding picker spindles 16 may be controlled. By virtue of the slip fit between the upper and lower bearing housings 54 and 50, and the splined connection 33 between shaft 18 and sprocket 40, the piston member 74 continuously gravitates downwardly within cavity 72 until the surfaces 34 of the doffer pads 32 contact the picker spindles 16. As the surfaces 34 of the doffer pads wear, the piston member 74 and shaft 18 automatically move downwardly to maintain continuous contact between the doffer pads and the picker spindles.

In order to prevent upward movement of the piston member 74, and the shaft 18 and doffer stack assembly movable therewith, the volume 80 above the piston member is maintained full of a suitably incompressible fluid, such as hydraulic fluid or the like. In accordance with a preferred embodiment of the invention, a reservoir 82 containing the fluid is provided in fluid communication with volume 80 through a fluid transfer line 84. The fluid from reservoir 82 flows into volume 80 under pressure (either gravitational pressure, or under the influence of an external source of pressure as will be described) to continuously maintain volume 80 full of liquid. A one way check valve 86 is interposed in line 84 to prevent the backflow of fluid from volume 80. By so doing, the upward movement of valve piston 74 is prevented by continuously maintaining the volume 80 full of the fluid.

A bypass line 88 extends between line 84 and reservoir 82 to bypass check valve 86. A control valve 90 is interposed in line 88 to selectively permit and prevent the flow of fluid from volume 80 back into reservoir 82. A bleed valve 92 is provided through an upper portion of cover member 64 to vent volume 80 of trapped air.

During normal operation of the invention, the bypass valve 90 is closed preventing the backflow of fluid from volume 80. The piston member 74 and the drive shaft 18 descend by gravity until the surfaces 34 of the doffer pads 32 contact the picker spindles 16. As the piston member 74 descends in cavity 72, the volume 80 is continuously maintained full of fluid directed thereinto from reservoir 82, thereby preventing upward movement of the piston member 74 and the drive shaft 18 and doffer stack assembly movable therewith.

As the doffer pads 32 wear during operation of the cotton picker, the contact between the doffer pads 32 and the picker spindles 16 is automatically and continuously maintained by the gravitational downward movement of the piston member 74, drive shaft 18 and the doffer stack assembly. The volume 80 is maintained full of fluid from reservoir 82 and the backflow of fluid from the reservoir is prevented by check valve 86. Should the doffer stack assembly require service, the bypass valve 90 can be opened to permit the piston member 74, shaft 18 and doffer stack assembly to be raised to permit the doffer stack assembly to be disconnected at the junction connection 28.

A second preferred embodiment of the invention is shown in FIG. 2, which is substantially identical in function and construction to the first preferred embodiment hereinabove described, except that a threaded adjustment device or means is provided to permit additional pressure over gravity to be applied to the doffer stack assembly, and to permit the gravitational downward movement of the doffer stack assembly to be overridden. The structural elements which are common between the first and second embodiments are designated by the same reference numerals in FIGS. 1 and 2 and the disclosure of the relationship and function of these structural elements as discussed above with regard to FIG. 1 are incorporated by reference and will not herein be repeated.

Referring to FIG. 2, a substantially vertical adjustment rod 94 is attached to and extends upwardly from the upper surface of piston member 74 and is moveable therewith. Adjustment rod 94 is slidably received and extends through an opening formed in the top surface of cover member 64, with a suitable O-ring seal 98 provided between rod 94 and cover member 64 to prevent fluid flow from volume 80 therethrough.

An upwardly extending sleeve member 100 is attached to and extends upwardly from cover member 64, with the upper portion of rod 94 extending therethrough. The upper portion of rod 94 is threaded to receive a locking nut 102. Locking nut 102 has an outside dimension greater than the inside diameter of sleeve 100 such that tightening of nut 102 against the upper edge of sleeve 100 causes the piston member 74 to rise within cavity 72.

In operation, the second embodiment of the invention permits the operator to select the desired spatial relationship between the doffer element pads 32 and the picker spindles 16. If it is desired to continuously maintain contact between the pads 32 and the spindles 16, the adjusting nut 102 is loosened and spaced above sleeve 100, as shown in phantom line in FIG. 2, and the adjustment mechanism operates in exactly the same manner as discussed above with regard to the embodiment of FIG. 1. That is, the doffer stack assembly continuously gravitates downwardly into contact with the picker spindles 16 as the doffer pads 32 wear during normal operation until the nut 102 contacts the upper surface of sleeve 100. The clearance between nut 102 and sleeve 100 is sufficient to permit downward movement of the doffer stack assembly to compensate for anticipated wear of the doffer pads 32.

If the field conditions dictate that it is desirable to maintain a small clearance between the doffer pads 32 and the picker spindles 16, the bypass valve 90 is opened and the adjusting nut is tightened against the upper edge of sleeve 100 causing upward movement of the piston member 74, drive shaft 18 and the doffer stack assembly so as to create the desired clearance between the surfaces 34 of the doffer pads 32 and the picker spindle surface 36. The bypass valve 90 is then returned to its closed position and the desired clearance is maintained.

If the field conditions dictate that it is desirable to increase the pressure applied between the doffer pads 32 and the spindles 16 to create an interference fit therebetween, the adjusting nut 102 is loosened and a downward pressure is applied to the adjusting rod 94 causing the piston member 74, drive shaft 18 and doffer stack assembly 24 to move downwardly. In so doing, the volume 80 fills with fluid from reservoir 82 preventing upward movement of these elements and thereby maintaining the interference fit between the doffer pads 32 and the spindles 16. As the doffer pads wear away during use, the above procedure may be repeated to once again achieve the desired interference fit.

A third preferred embodiment of the invention is shown in FIG. 3, wherein an external pressure source is applied to the fluid in fluid reservoir 82, which thus functions in the nature of an accumulator, to apply pressure to the fluid acting on the piston member and thereby apply a force at the doffer pads to the picker spindles. The third embodiment is substantially identical in function and construction to the first embodiment except for the provision of an external pressure source. The structural elements which are common between the first and third embodiments are designated by the same reference numerals in FIGS. 1 and 3 and the disclosure of the relationship and function of these structural elements as discussed above with regard to FIG. 1 are incorporated by reference and will not herein be repeated.

Referring to FIG. 3, various alternative sources of external pressure are schematically shown in communciation with the fluid reservoir 82. These sources apply a pressure to the fluid within reservoir 82 and thereby increase the pressure of the fluid in volume 80 beyond the pressure which is provided by hydrostatic head. The pressure in volume 80 exerts a downward force on piston member 74 which, in turn, is translated through drive shaft 18 to apply a downward force urging the doffer pads 32 into contact with the picker spindles 16. The greater the pressure within reservoir 82 the greater the force applied at the doffer pad to picker spindle interface. A pressure gauge 104 may be provided in communication with reservoir 82 to indicate the pressure therein.

The source of external pressure may take various alternative forms in accordance with alternate embodiments of the invention, which are schematically represented in FIG. 3. One source of external pressure may be a pressurized gas which is directed from a suitable source 106 through line 108 into reservoir 82. The pressure of the gas may be adjusted for different field conditions, with the reservoir 82 and the associated gas source 106 thus functioning together in the nature of a pressurized hydraulic fluid accumulator.

An alternative source of external pressure may be air pressure directed from the conveyor fan plenum 110 of the cotton picker through line 112 into reservoir 82. Another alternative source of external pressure may be pressure from the exhaust manifold of the cotton picker's internal combustion engine 114 (which pressure varies with engine load), with the gas pressure directed through line 116 into reservoir 82. Generally, the higher the cotton yield, the higher the doffer load and it can be desirable to have higher doffer to spindle pressure.

A further source of external pressure may be pressure from the water system 118 on the cotton picker through line 120 into reservoir 82. The cotton picker is typically provided with a pressurized moisture system that supplies water to the spindles. The higher the cotton yield, the higher the moisture system pressure. This pressure may be applied to the doffer assembly and would automatically compensate with higher pressure at the interface between the doffer pads and the spindles.

While specific embodiments of the invention have been shown and described, it is anticipated that certain changes may be made therein without departing from the spirit and scope of the invention as set forth in the appended claims.

What is claimed is:

1. In a cotton picker doffer assembly including picker spindles and a doffer element having doffer pads positioned adjacent to said spindles for removing cotton therefrom, an adjustment mechanism for adjusting the vertical relationship of said doffer element relative to said picker spindles, comprising: a substantially vertical shaft about which said doffer element is attached; means for rotating said shaft which permits said shaft to gravitate downwardly such that as said doffer pads wear they are maintained in continuous contact with said picker spindles; and means for continuously preventing upward movement of said shaft as said shaft gravitates downwardly so as to maintain said doffer pads in contact with said picker spindles, comprising hydraulic piston means operatively connected with said vertical shaft, said piston means being movably positioned in hydraulic cylinder means and defining therewith a cavity of variable volume having a substantially incompressible fluid therein, said piston means being movably in response to downward gravitational movement of said vertical shaft to increase the volume of said fluid in said cavity with the increased volume of the fluid in said cavity acting to prevent reverse movement of said pisston means so that said piston means prevents upward movement of said vertical shaft.

2. The invention as defined in claim 1, wherein said means for rotating said shaft includes a rotating drive member received about said shaft and having a splined connection with said shaft so as to permit vertical movement of said shaft relative to said drive member.

3. The invention as defined in claim 1, including one-way fluid check valve means operatively associated with said cavity for permitting flow of fluid out of said cavity, and for preventing flow of fluid out of said cavity.

4. The invention as defined in claim 1, including means for applying increased pressure to said fluid in said cavity so as to apply an increased downward force at said doffer pads on said picker spindles by the increased fluid pressure acting on said piston means to downwardly urge said vertical shaft.

5. In a cotton picker doffer assembly including picker spindles and a doffer element having doffer pads positioned adjacent to said spindles for removing cotton therefrom, an adjustment mechanism for adjusting the vertical relationship of said doffer element relative to said picker spindles, comprising: a substantially vertical shaft about which said doffer element is attached; means for rotating said shaft which permits said shaft to gravitate downwardly such that as said doffer pads wear they are maintained in continuous contact with said picker spindles; and means for continuously preventing upward movement of said shaft as said shaft gravitates downwardly so as to maintain said doffer pads in contact with said picker spindles, wherein said means for continuously preventing upward movement of said shaft includes a piston member attached to an upper portion of said shaft and movable therewith, said piston member being received within a hydraulicl cylinder cavity for vertical movement therein, and means for continuously maintaining the volume of said cavity above said piston member full of a substantially incompressible fluid so as to prevent upward movement of said piston member in said cavity.

6. The invention as defined in claim 5, wherein said volume of said cavity above said piston member is in fluid communication with a reservoir containing said fluid through a fluid line, said fluid line having a check valve therein which permits the flow of fluid from said reservoir through said fluid line into said cavity and prevents the flow of fluid from said cavity through said fluid line.

7. The invention as defined in claim 6, further including means for applying increased pressure to said fluid in said reservoir from an external source so as to apply an increased downward force at said doffer pads on said picker spindles.

8. The invention as defined in claim 7, wherein said external source of pressure comprises means providing an adjustable source of gas pressure whereby said reservoir functions as an adjustable accumulator means.

9. The invention as defined in claim 7, wherein said external source of pressure comprises a conveyor fan plenum of a cotton picker.

10. The invention as defined in claim 7, wherein said external source of pressure comprises engine exhaust manifold means of a cotton picker.

11. The invention as defined in claim 7, wherein said external source of pressure comprises a spindle moistener system of a cotton picker.

12. The invention as defined in claim 6, further including adjustment means for selectively limiting downward movement of said piston member and said vertical shaft.

13. The invention as defined in claim 12, wherein said adjustment means includes a substantially vertical rod member, said rod member having a lower end portion extending downwardly into said cavity for attachment to said piston member, and an upper end portion extending upwardly and outwardly through an opening in said cavity, and adjustment means for selectively limiting the extent of downward movement of said rod member and said piston member within said cavity.

14. The invention as defined in claim 13, wherein said upper portion of said rod member is threaded and slidably extends through an upwardly extending sleeve member in vertical alignment with said opening in said cavity, and said adjustment means includes an adjustment nut threadedly received about said threaded upper portion of said rod member such that downward movement of said adjustment nut against said sleeve member causes said piston member to move upwardly in said cavity.

15. The invention as defined in claim 6, including means for selectively relieving the fluid pressure in said cavity.

16. The invention as defined in claim 15, wherein said means for selectively relieving the fluid pressure in said cavity includes a bypass line extending between said reservoir and said fluid line, said bypass line having a bypass valve therein.

* * * * *